United States Patent
Friese

(10) Patent No.: US 6,571,590 B1
(45) Date of Patent: Jun. 3, 2003

(54) METHOD FOR PRODUCING A RIM FOR A PNEUMATIC TIRE

(75) Inventor: Udo Friese, Ahlen (DE)

(73) Assignee: WF-Maschinenbau und Blechformtecknik GmbH & Co. KG, Sendenhorst (DE)

( * ) Notice: Subject to any disclaimer, the term of this patent is extended or adjusted under 35 U.S.C. 154(b) by 0 days.

(21) Appl. No.: 09/869,567
(22) PCT Filed: Dec. 30, 1999
(86) PCT No.: PCT/EP99/10469
§ 371 (c)(1), (2), (4) Date: Jun. 29, 2001
(87) PCT Pub. No.: WO00/40350
PCT Pub. Date: Jul. 13, 2000

(30) Foreign Application Priority Data

Dec. 30, 1998 (DE) .......................................... 198 60 732

(51) Int. Cl.⁷ .............................................. B21D 22/00
(52) U.S. Cl. ........................... 72/85; 72/83; 29/894.324
(58) Field of Search ................................. 72/82, 83, 84, 72/85; 29/894.322, 894.323, 894.324

(56) References Cited

U.S. PATENT DOCUMENTS

| | | | | |
|---|---|---|---|---|
| 4,554,810 A | * | 11/1985 | Jurus ............................. | 72/83 |
| 4,624,038 A | * | 11/1986 | Walther ......................... | 72/85 |
| 5,533,261 A | * | 7/1996 | Kemmerer ............. | 29/894.322 |
| 5,579,578 A | * | 12/1996 | Ashley, Jr. ............. | 29/894.322 |
| 5,740,609 A | * | 4/1998 | Jurus ..................... | 29/894.324 |
| 5,832,608 A | * | 11/1998 | Pollkotter .............. | 29/894.324 |

* cited by examiner

*Primary Examiner*—Ed Tolan
(74) *Attorney, Agent, or Firm*—Barnes & Thornburg

(57) ABSTRACT

The invention related to a method for producing a rim for a pneumatic tire. A rim base with a rear rim flange is produced from a ring-shaped blank by exerting pressure. Said rim base is then connected to a bowl of a rim at the side thereof facing away from the rear rim flange. In order to produce said rim base, the blank is inserted into a compression mould which is embodied as a cavity and is pressed against the at least partially contoured interior of the compression mould by means of at least one compression roll.

9 Claims, 9 Drawing Sheets

METHOD FOR PRODUCING A RIM FOR A PNEUMATIC TIRE

This application is a 35 USC 371 of PCT/EP99/10469 filed Dec. 30, 1999.

BACKGROUND AND SUMMARY OF THE INVENTION

The invention relates to a method for producing a rim for a pneumatic tire for vehicles.

From German Patent Document DE 32 39 675 C2, a method is known for producing a one-piece vehicle wheel of a light metal which consists of a hub part and a pneumatic-tire rim and, in the case of which a wheel disk is produced from a round blank by means of a compression operation and, for forming a rim base, the remaining ring edge is split and, by means of a subsequent forming operation, the final rim base shape is produced with legs of different widths while the thickness is approximately the same. It was found in practice, that, when producing such pneumatic-tire rims, unbalance problems occur as a result of the "splitting", which make the produced pneumatic-tire rim useless.

It is customary nowadays to produce the vehicle wheel from two components, specifically, on the one hand, a rim disk, which can be cast or rolled, and the actual rim well which is produced by a compression operation. The two components are then welded together. Because the rim disk must additionally be adapted to the purchasers' aesthetic demands, but the rim base does not have to take this demand into account, such a process is more cost-effective than producing the actual vehicle wheel in one piece. The rim base can always have the same construction, but the rim disk can be produced in smaller series corresponding to the purchasers' wishes.

When producing the rim base, which is subsequently welded to the rim disk, the current practical approach is such that a round blank is used which has an outside diameter sufficient for producing the rim base after the compression operation was carried out which is applied to the round blank on the outside. In which case therefore, the center hole of such a round blank is extremely large. Since the round blank is punched out of a sheet metal plate, this results in high expenditures with respect to material as a result of the subsequent punching-out of the center hole. The area of the punched-out center hole is discarded, which results in an expensive and high-expenditure process.

It is an object of the invention to suggest a production method for a rim of a pneumatic tire in which the rim base is produced in a compression operation, but the rim disk is produced as a cast or rolled part, whereby the material expenditures for producing the rims can be considerably reduced in comparison to the methods known in practice.

This object on which the invention is based is achieved by the placing a blank in a compression mold having a cavity and using a pressure roller to press the blank against the at least partially contoured interior side of the compression mold.

The blank can be formed by a round blank, by a forged part, a cast part, a turned part, or the like.

A forged part can be preformed, for example, by cold forming on a so-called wobble press, whereby advantages are achieved in comparison to the other above-mentioned types of blanks.

Thus, the material used for such a forged part is considerably less in comparison to a round blank because, by the cutting-to-size alone, 30 to 40% of the material will occur as waste. In the case of a forged part produced on a wobble press, this fraction is considerably lower. By using a blank produced in this manner, the production costs are considerably reduced in that, for producing the blank, a block is used which is cut off a rod, for which light metal is particularly suitable.

Since the production of the preformed blank as well as the compression operation for producing the rim base represent a cold forming, advantages are also obtained thereby in comparison to, for example, a cast blank. Because of the resulting higher strength caused by cold work-hardening, the wall cross-sections can have smaller dimensions, which reduces the production costs and causes more favorable running characteristics of the pneumatic-tire rim.

In this context, it is provided according to an advantageous embodiment of the invention to calibrate the wall thickness of the rim base immediately during the pressing of the blank onto the interior side of the compression mold or subsequently corresponding to the desired rim requirements; that is, to construct and/or contour the walls in different thicknesses.

The invention also makes it possible to produce the rim base in one piece, so that a welding-together, as required in the case of a rim base which, for cost reasons, has a two part construction, can be eliminated. Ideally, such a one-piece rim base is particularly suitable for tubeless tires because of its airtightness.

While, for producing the known light-metal rims, on which the highest demands are made with respect to their quality, approximately 60 operating cycles are required, as a result of the invention, a light-metal rim can be produced at a fraction of these labor expenditures.

It is a characteristic of the method of the invention that a blank is used as the basis whose outside diameter corresponds approximately to the outside diameter of the rim, so that the previously occurring losses of material are avoided.

According to an advantageous further development of the invention, a round blank, which is clamped between a main spindle and a pressure pad of a system and which is used as a blank, is placed by means of a compression process against the compression mold constructed as a cavity; that is, is placed from the inside into the cavity. When the round blank is placed against the interior side of the cavity, not only the round blank is adapted to shape of the cavity, but simultaneous, the wall thickness of the round blank can be calibrated, as mentioned above, corresponding to the requirements of the rims. Thus, the wall thickness of the formed rim base, originating from a round blank which has a uniform material thickness, viewed along its length, can have different wall thicknesses where a relatively large wall thickness is required in the area of the rear rim flange, and a relatively large wall thickness has to be provided in the area of the marginal edge of the rim base facing away from the rear rim flange, the wall thickness between these two areas can be smaller.

Subsequently, the thus produced rim base is welded to the actual rim disk. This type of process has the disadvantage that certain unbalance phenomena may occur during the welding which require a reworking.

In order to avoid this disadvantage, it is suggested according to a further development of the method that the round blank, which is fixed between the main spindle and the pressure pad, is placed from the inside on a compression lining constructed as a cavity, so that a first drawn element is established. In this case, the first drawn element can have an identical wall thickness viewed along its entire length, which wall thickness corresponds to the wall thickness of the initial round blank.

In a second operating cycle, this first drawn element is then welded to the rim disk, and this unit consisting of the rim disk and the fixed first drawn element is now clamped in between a main spindle and a compression lining. By means of a compression method, the first drawn element is formed to produce the actual rim base. The other compression lining has the shape of the rim base, so that the shape of the rim base is produced by the placing of the first drawn element and simultaneously, as a result of stretching, the first drawn element wall thickness is calibrated to correspond to the requirements of the actual rim base during the production.

It was found that, as a result of this method of operation, the possible unbalance phenomena occurring because of the welding of the first drawn element to the rim disk are compensated and eliminated by the actual subsequent compression process. Although as a result of this process, a multi-stage operating method is provided, it also leads to a wheel rim which can be used immediately.

Here also, the outer circumference of the initial round blank, before the production of the first drawn element, has an outside diameter which corresponds approximately to the outside diameter of the actual rim base. Thus, the rim base can have a larger length than the outside diameter of the actual round blank because, as a result of thinning of the material, a stretching of a first draw takes place.

The high expenditures of material, which are still customary in the prior art, are also avoided in the case of this method, in which case it can generally be said that a saving of material of approximately 40 to 50% can be achieved in comparison to the methods so far used in practice.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
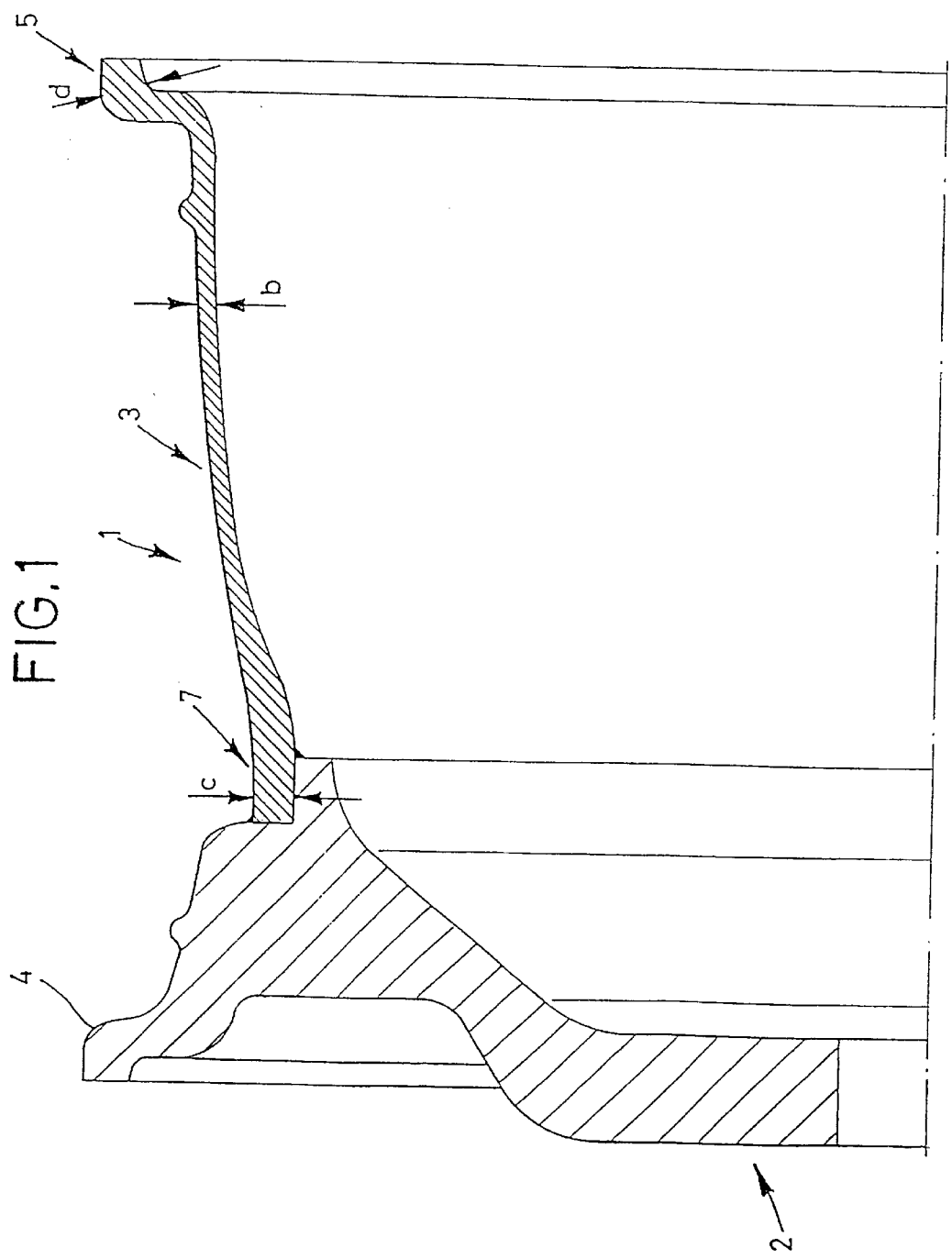
FIG. 1 is a sectional view of a part of a wheel rim with a rim disk and a rim base.

FIG. 1 is a sectional view of the part of a pneumatic-tire rim 1 which essentially consists of the actual rim disk 2 and of a rim base 3. The rim disk 2 has a frontal rim flange 4 and the rim base 3 has a rear rim flange 5, the rim base 3, on its marginal edge 7 facing away from the rear rim flange 5, being fixedly connected, for example, welded to the rim disk.

Also, FIG. 1 clearly shows that the rim base 3 in the area of the marginal edge 7 and in the area of the rear rim flange 5 has a larger wall thickness than in the center part, these wall thickness areas in the area of the marginal edge 7 being marked c; in the area of the rear rim flange 5, being marked d, and in the area of the center part of the rim base 3, being marked b.

Figure 2:
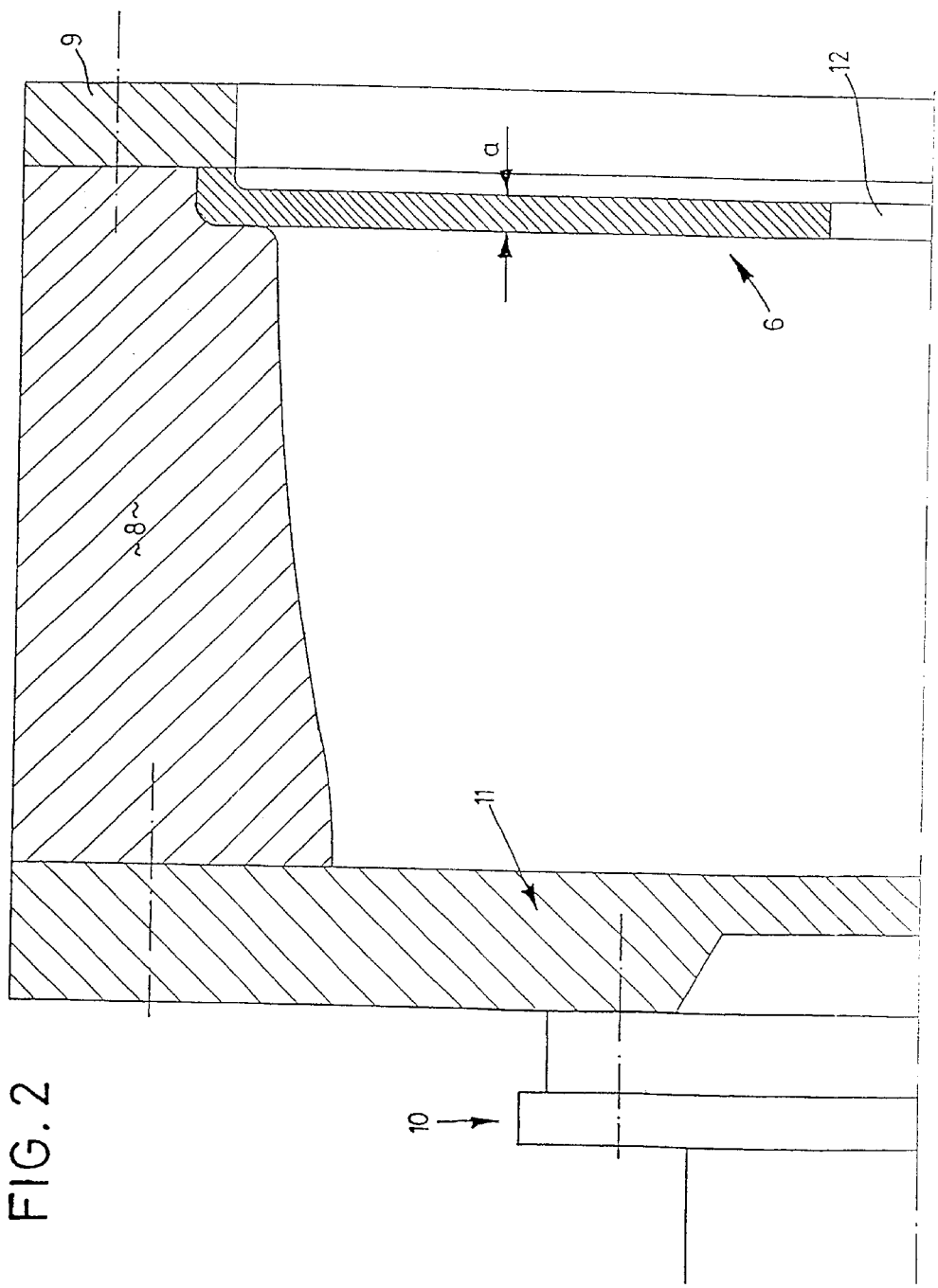
FIG. 2 is a view of the starting position of a method for producing a rim base from a round blank by using a cavity has a compression lining according to an embodiment of the method of the present invention.

FIG. 2 shows a round blank 6 whose wall thickness is marked a and which is fixed between a compression mold 8 and a pressure pad 9, the compression mold 8 being fixed on a main spindle 10 and being carried by a face plate 11. FIG. 2 also shows the center hole 12 existing in the round blank 6.

For producing the rim base 3, in a compression process, the round blank 6 is now placed onto the interior side of the compression mold having the shape of the rim base and in the process is stretched so that the center area of the thus deformed round blank 6 can have the thicker area b, while the rear marginal edge 7 can continue to have the thickness of the round blank 6, thus a. After the production of the rim base 3, the latter is fixed on the rim disk 2 in the area of the marginal edge 7 of the rim base 3 by welding.

Figure 3:
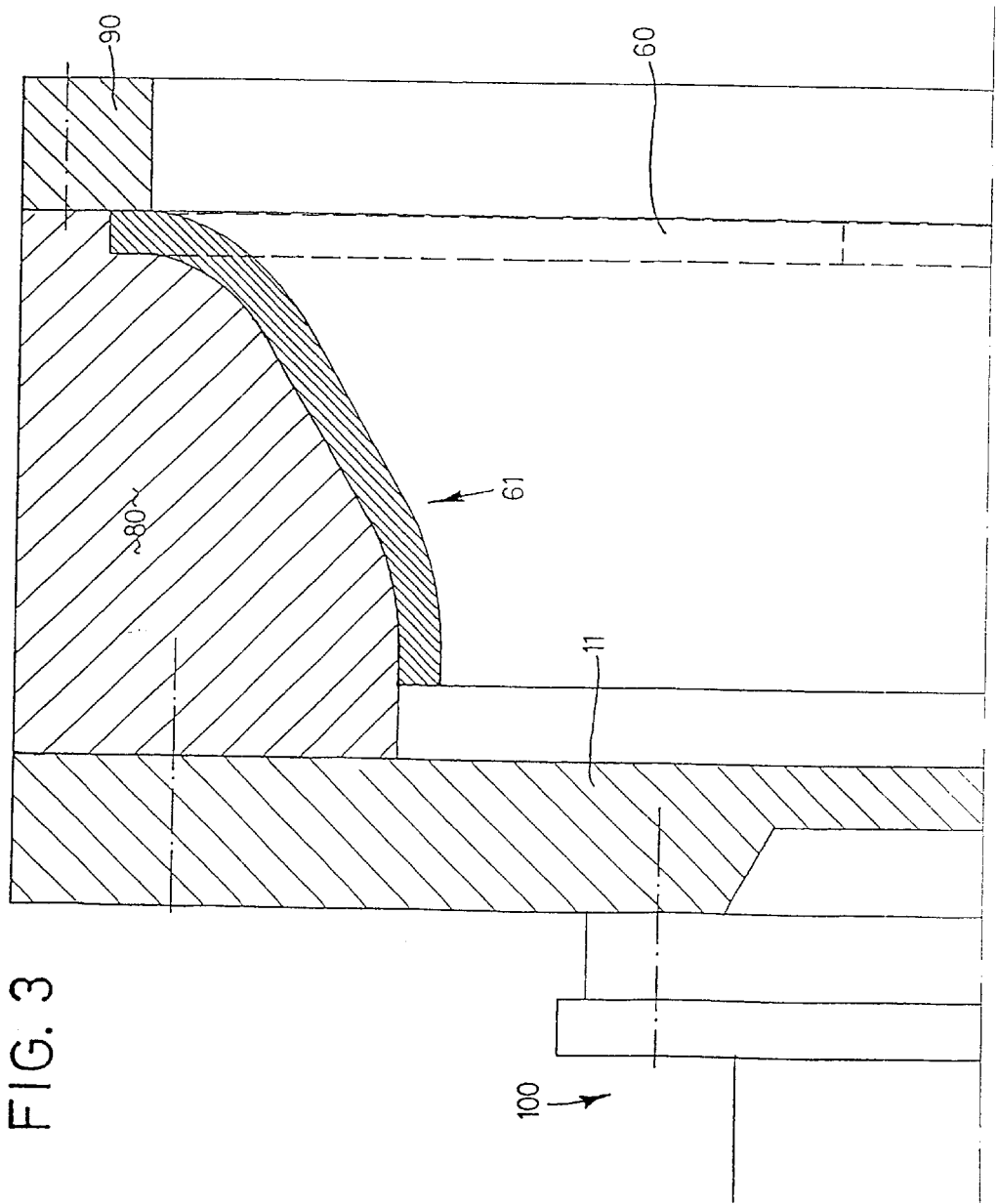
FIG. 3 is a view of the production of a first drawn element by placing a round blank against the interior side of a compression lining according to another embodiment.

FIG. 3 illustrates a further development of the method. Here, a round blank 60 is shown by a broken line which is fixed between a pressure pad 90 and a compression lining 80. The compression lining is carried by a face plate 11 and this face plate 11, in turn, being carried by a main spindle 100 and, as a result, being able to be caused to carry out a circulating rotation. The round blank 60 illustrated by a broken line will then be deformed to form a first drawn element 61 by a compression process, which first drawn element 61 is illustrated in FIG. 3 by a solid line.

Figure 4:
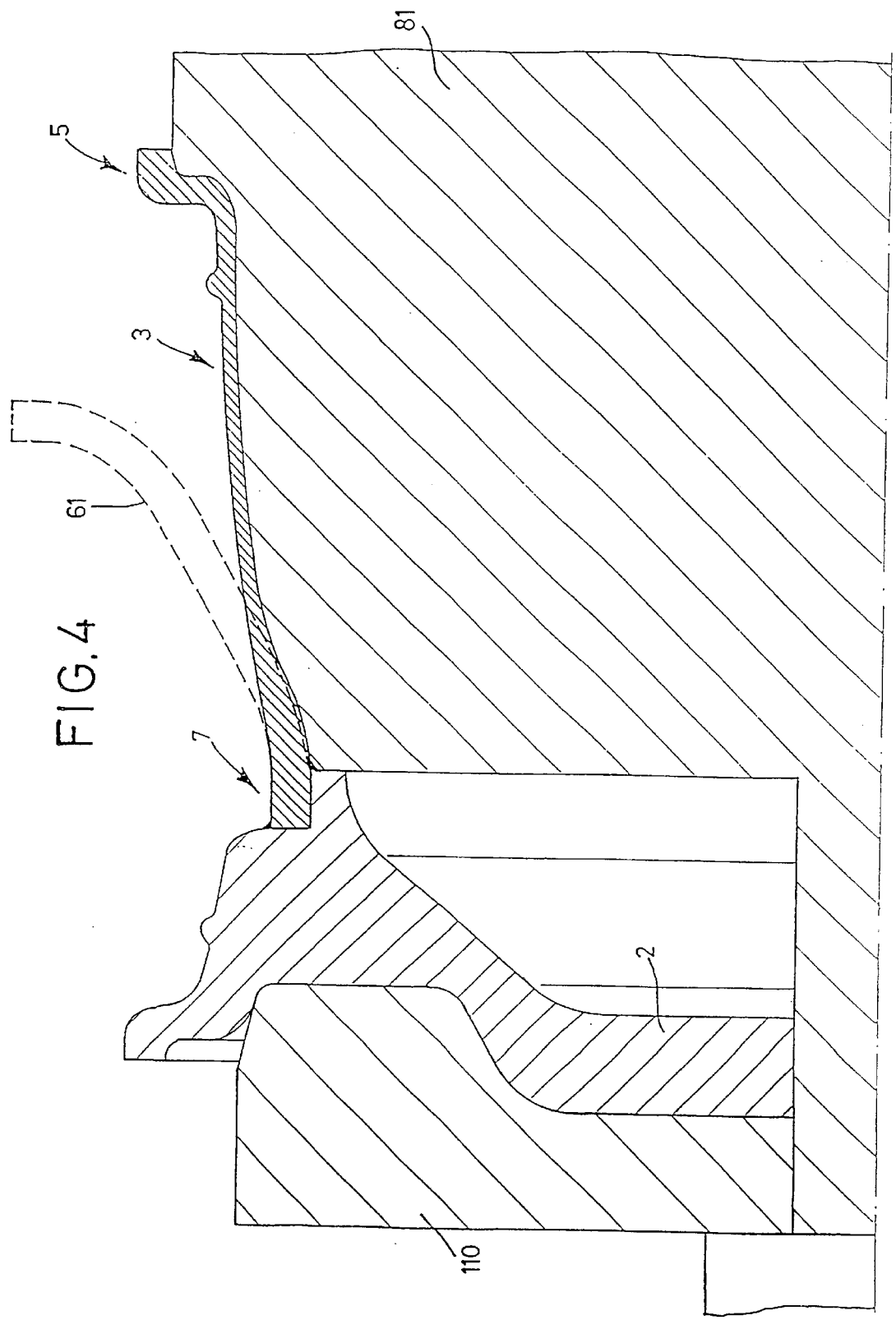
FIG. 4 is a view of the production of the rim base from the first drawn element illustrated in FIG. 3, the first drawn element already being fixed on the rim disk.

This first drawn element 61 will then—as illustrated in FIG. 4 by a broken line—be fixed on the rim disk 2, for example, by welding and the rim disk 2 is then fixed on a receiving disk 110 which is fixedly connected with the compression lining 81. By using a conventional pressure process, the first drawn element 61 can now be drawn off and be deformed such that it assumes the shape of a rim base. It is also possible here that the rear rim flange 5 and the marginal edge 7 have material thickness which corresponds to the material thickness of the initial round blank, while in the center area of the rim base has a significantly lower material thickness.

The following is mentioned as an example for explaining the wall thickness relationships:

The material thickness of the initial round blank 6 amounts to 7 mm; the material thickness of the rear rim flange 5 also amounts to 7 mm; the material thickness of the marginal edge 7 amounts to 6 mm, while the material thickness of the center area of the rim base, thus in the area b, can about 3 mm.

Figure 5:
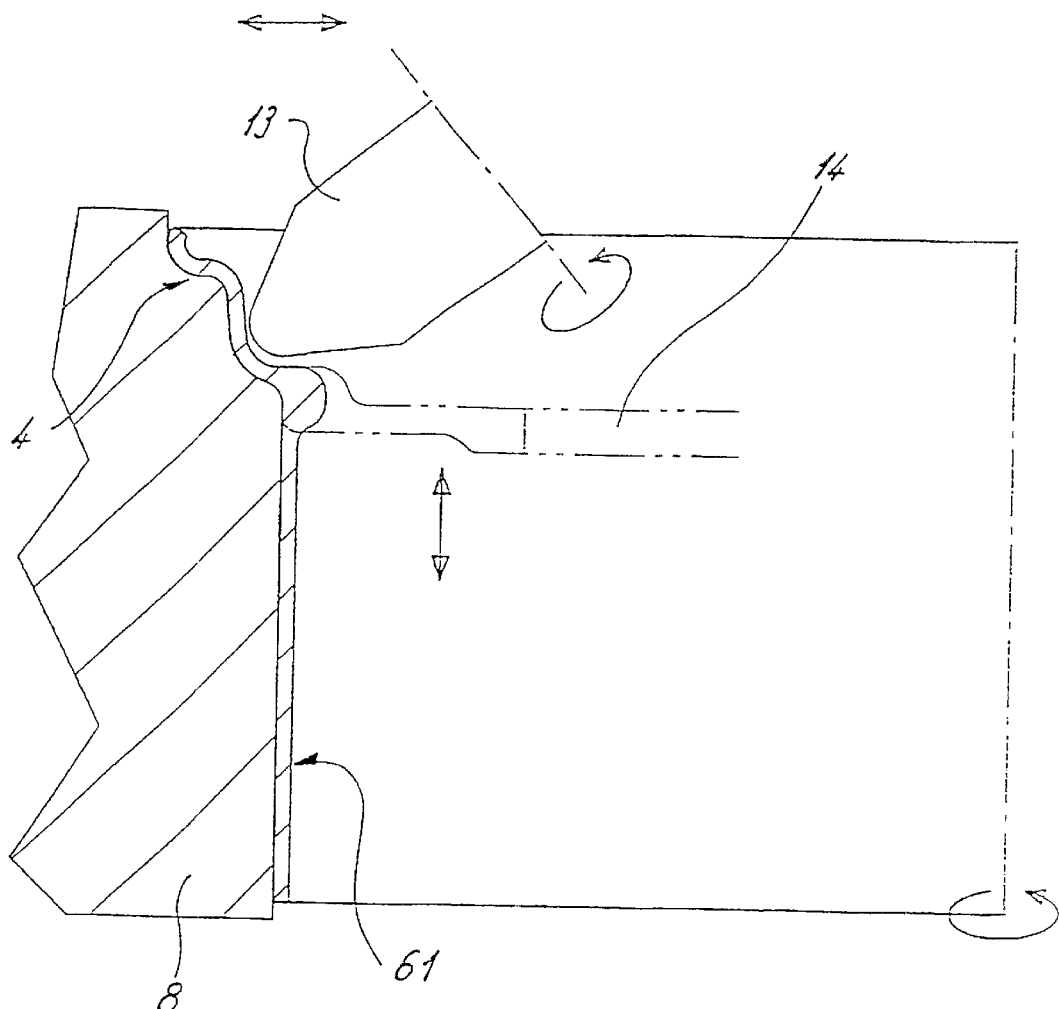
FIGS. 5 to 7 are views of various process steps when producing a rim base from a preformed blank.
Figure 6:
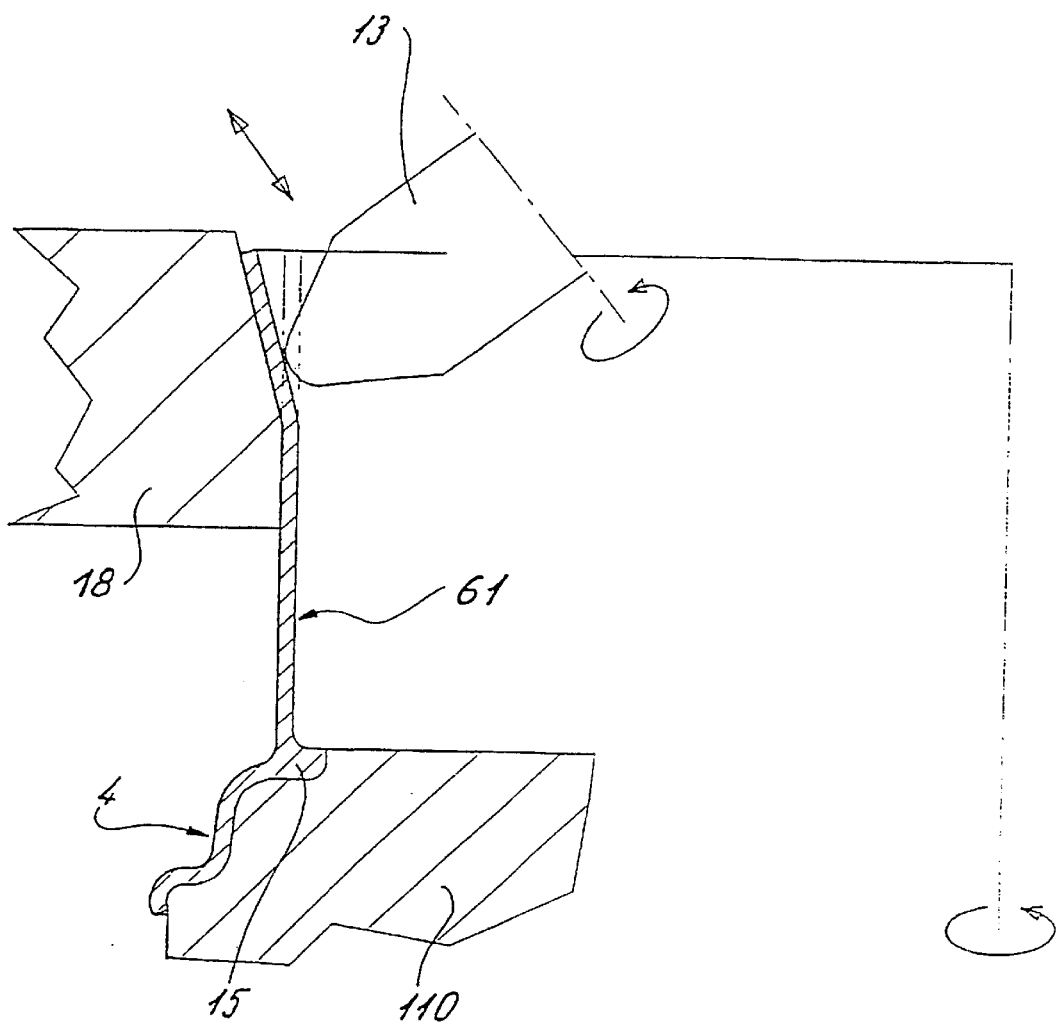
Figure 7:
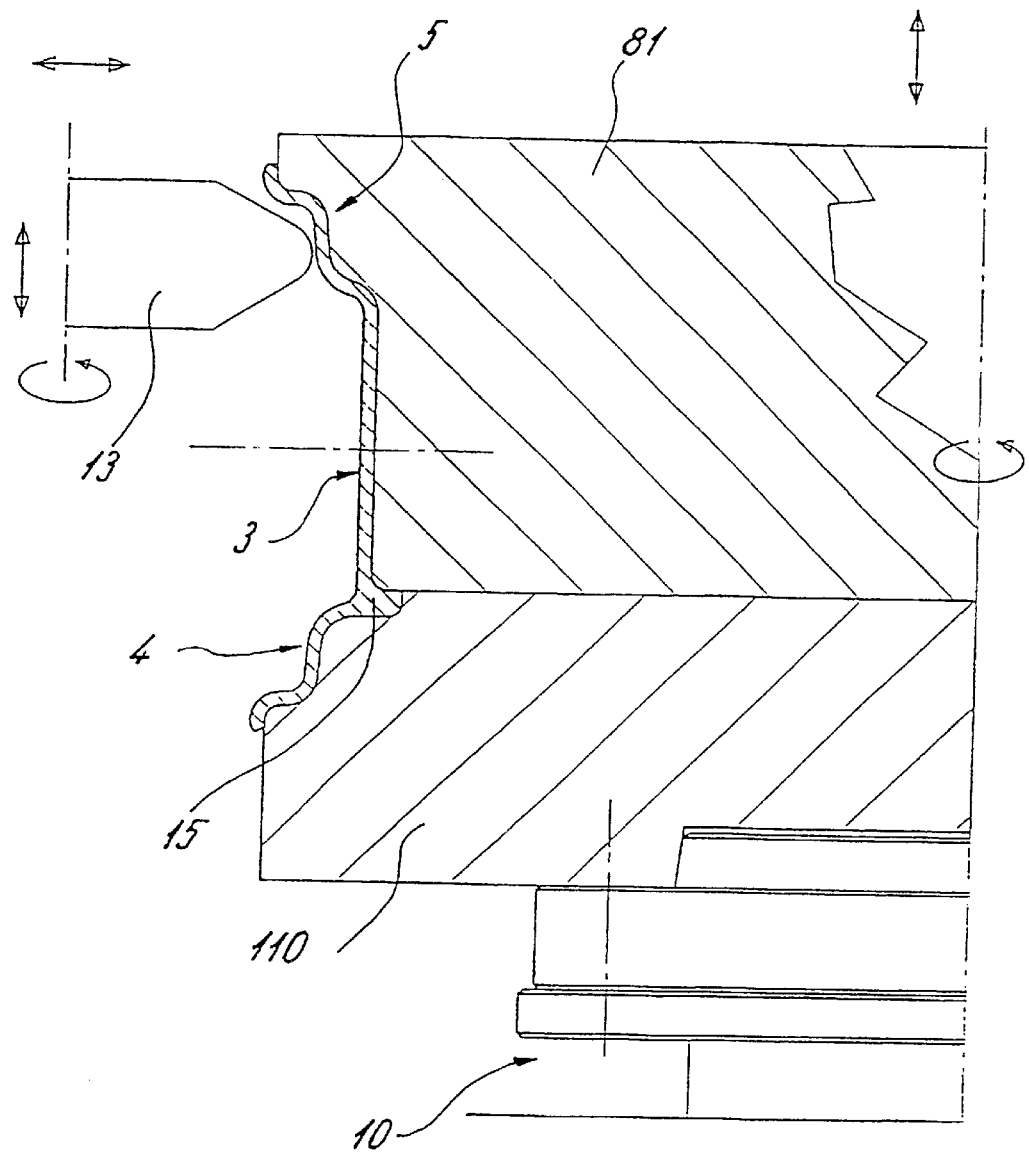

FIGS. 5 to 7 show different process stages by means of which a blank 14 preformed in a key-type manner, which was preformed, for example, on a wobble press, by cold forming, is shaped into a one-piece rim base.

Figure 8:
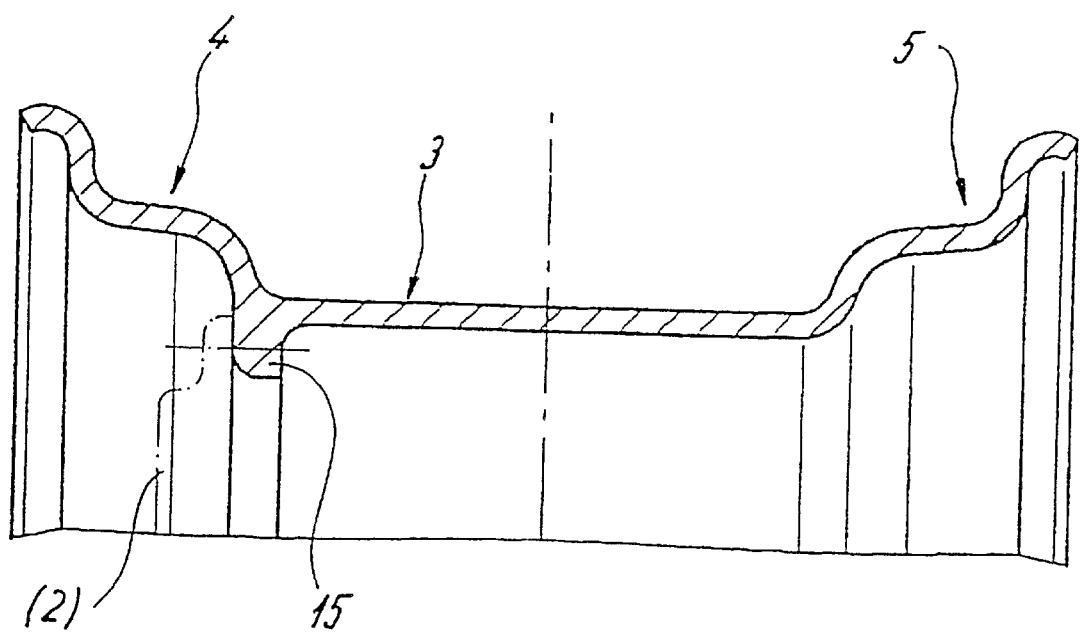
FIG. 8 is a partial longitudinal sectional view of the thus finished rim base.

FIG. 5 illustrates that the ring-shaped preformed blank 14, which is illustrated by a dash-dotted line, is placed in the compression mold 8 which is constructed as a cavity and is partially contoured. The blank is pressed by at least one rotating compression roller 13 which, relative to the rotationally symmetrical compression mold 8, moves axially and radially, against the interior wall of the compression mold 8 so that a first drawn element 61 is created. In this case, the frontal rim flange 4 is completely molded on, in which case a connection collar 15 is provided to which a rim disk 2 can be screwed which is illustrated by a dash-dotted line in FIG. 8.

After the production of the first drawn element 61 according to FIG. 5, the molding-on of the rear rim flange 5 takes place. As shown in FIG. 6, the first drawn element 61 is placed by its forward rim flange onto the receiving disk 110, which in the receiving area is adapted to the frontal rim flange 4 with respect to its contour.

At the opposite end, the first drawn element 61 is held in the compression mold 8 and is pressed by the compression roller 13 against a contoured exterior side of an abutment 18 which is constructed as a bevel and may be constructed as a roller.

In the next operating step shown in FIG. 7, the interior side of the first drawn element 61, by means of the bevel molded-on corresponding to FIG. 6, is supported by an interior compression lining 81 which has a contour onto which the bevel of the first drawn element 61 is pressed by the compression roller 13 from the rear rim flange 5.

Instead of the illustrated rolling, the first drawn element 61, can be molded, that is widened and/or contoured, on the end side by pressing. The pressing permits an even more precise production.

As mentioned above, FIG. 8 very clearly shows the one-piece structure of the complete rim base 3 which results in the above-described advantages. Another construction of the rim base 3 is illustrated in FIG. 9 which otherwise can be produced in the same manner as illustrated in FIGS. 5 and 7 and is explained in the specification.

Figure 9:
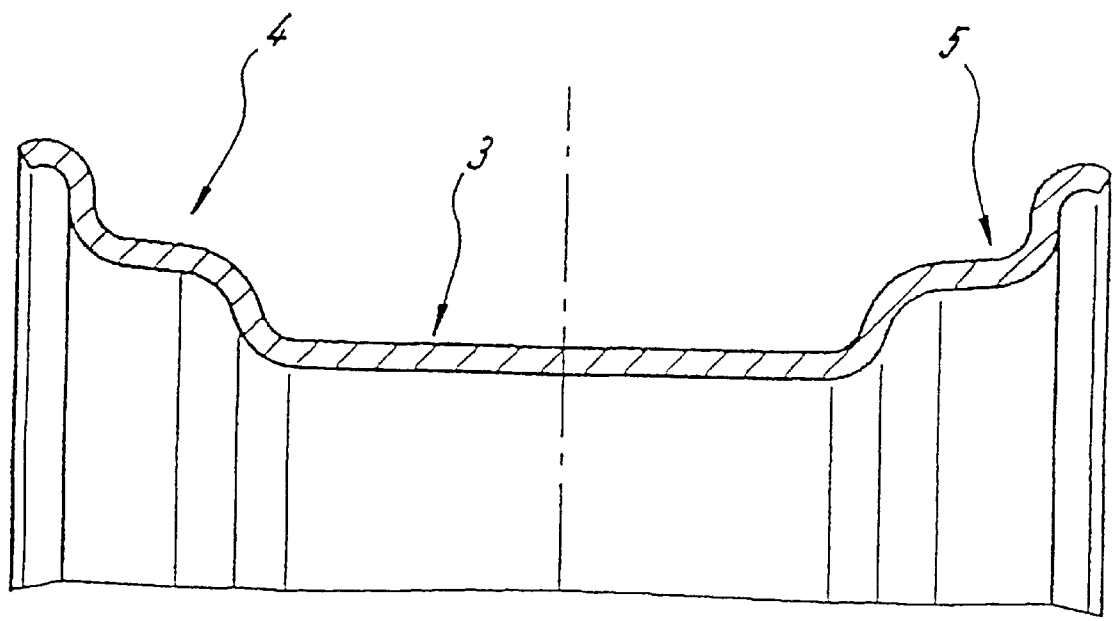
FIG. 9 is another partial longitudinal sectional view of a rim base produced according to the process steps of FIGS. 5 to 7.

The rim base according to FIG. 9 is constructed such that a rim disk, which is not shown, can, for example, be pressed in or is connected with the rim base in a different suitable manner, for example, by hard soldering or the like.

Naturally, it is also possible to produce a rim base 3, as illustrated in FIG. 1, from a preformed blank, in which case the rim disk 2 will then be welded to the rim base 3.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A method for producing a rim having a rim base coupled to a rim disk for a pneumatic tire, wherein the method for forming the rim base comprises:

placing a ring shaped blank into a compression mold constructed as a cavity;

pressing the blank by at least one pressure roller against the at least partially contoured interior side of the compression mold cavity to produce the rim base with a rear rim flange; and, wherein the rim base is produced from a round blank; and from the round blank fixed between the compression mold constructed as a cavity and a pressure pad and by means of one or several compression rollers, placing the round blank against an exterior compression lining, a first drawn element is produced;

the first drawn element is fixed to a rim disk;

subsequently, the rim disk with the first drawn element is fixed between a receiving disk, which is connected with a main spindle, and an interior compression lining, and the first drawn element is placed by one or several compression rollers against the interior compression lining while forming the rim shape and is calibrated in its wall thickness corresponding to desired rim requirements.

2. The method according to claim 1, wherein the rim base is produced from a preformed blank.

3. The method according to claim 1, wherein:

the rim base is produced from a round blank with a center hole; and the round blank is fixed between the compression mold constructed as a cavity and an abutment, is placed by one or several pressure rollers against the interior side of the compression mold, is calibrated in its wall thickness corresponding to desired rim requirements and is then fixed on the rim disk by welding.

4. The method according to claim 1, wherein part of a formed first drawn element produced by the pressing which adjoins the contoured area is at least one of widened from its free end and contoured.

5. The method according to claim 4, wherein the at least one of the widening and contouring takes place by one of pressing and rolling.

6. The method according to claim 4, wherein the first drawn element is fixed between a receiving disk, which is connected with a main spindle, and an interior compression lining and is then, by one or several compression rollers, pressed against the interior compression lining while forming the rim shape and is calibrated in this wall thickness corresponding to desired rim requirements.

7. The method according to claim 4, wherein for forming the at least one of widening and contouring, the first drawn element, on the exterior side, is pressed by a pressure roller against an abutment.

8. The method according to claim 2, wherein the preformed blank is produced by cold forming, the side wall of the preform in its contour being formed approximately corresponding to the contouring of a frontal rim flange.

9. The method according to claim 7, wherein the pressure roller against the abutment is in the form of a counter-roller.

* * * * *